United States Patent [19]

Bill et al.

[11] 4,135,851

[45] Jan. 23, 1979

[54] COMPOSITE SEAL FOR TURBOMACHINERY

[75] Inventors: Robert C. Bill, Rocky River; Lawrence P. Ludwig, Fairview Park, both of Ohio

[73] Assignee: The United States of America as represented by the Administrator of the National Aeronautics and Space Administration, Washington, D.C.

[21] Appl. No.: 801,290

[22] Filed: May 27, 1977

[51] Int. Cl.² ............................................. F01D 11/08
[52] U.S. Cl. .................................... 415/174; 415/200
[58] Field of Search ................. 415/174, 200, 199.4, 415/199.5, 217, 218; 277/96, 96.1, 96.2

[56] References Cited

U.S. PATENT DOCUMENTS

| 2,477,852 | 8/1949 | Bacon | 415/174 UX |
|---|---|---|---|
| 2,994,124 | 8/1961 | Denny et al. | 60/200 A X |
| 3,423,070 | 1/1969 | Corrigan | 415/200 |
| 4,063,742 | 12/1977 | Watkins, Jr. | 415/174 X |

Primary Examiner—Louis J. Casaregola
Assistant Examiner—Donald S. Holland
Attorney, Agent, or Firm—N. T. Musial; J. R. Manning; G. E. Shook

[57] ABSTRACT

A gas path seal suitable for use with a turbine engine or compressor is provided. A shroud wearable or abradable by the abrasion of the rotor blades of the turbine or compressor shrouds the rotor blades. A compliant backing surrounds the shroud. The backing may be made of corrugated sheets or the like with adjacent layers having off-set corrugations, with axes of the folds parallel to the rotor axis. The sheets may be bonded together at points of contact by brazing, welding or the like. In another embodiment a compliant material is covered with a thin ductile layer. A mounting fixture surrounds the backing.

5 Claims, 3 Drawing Figures

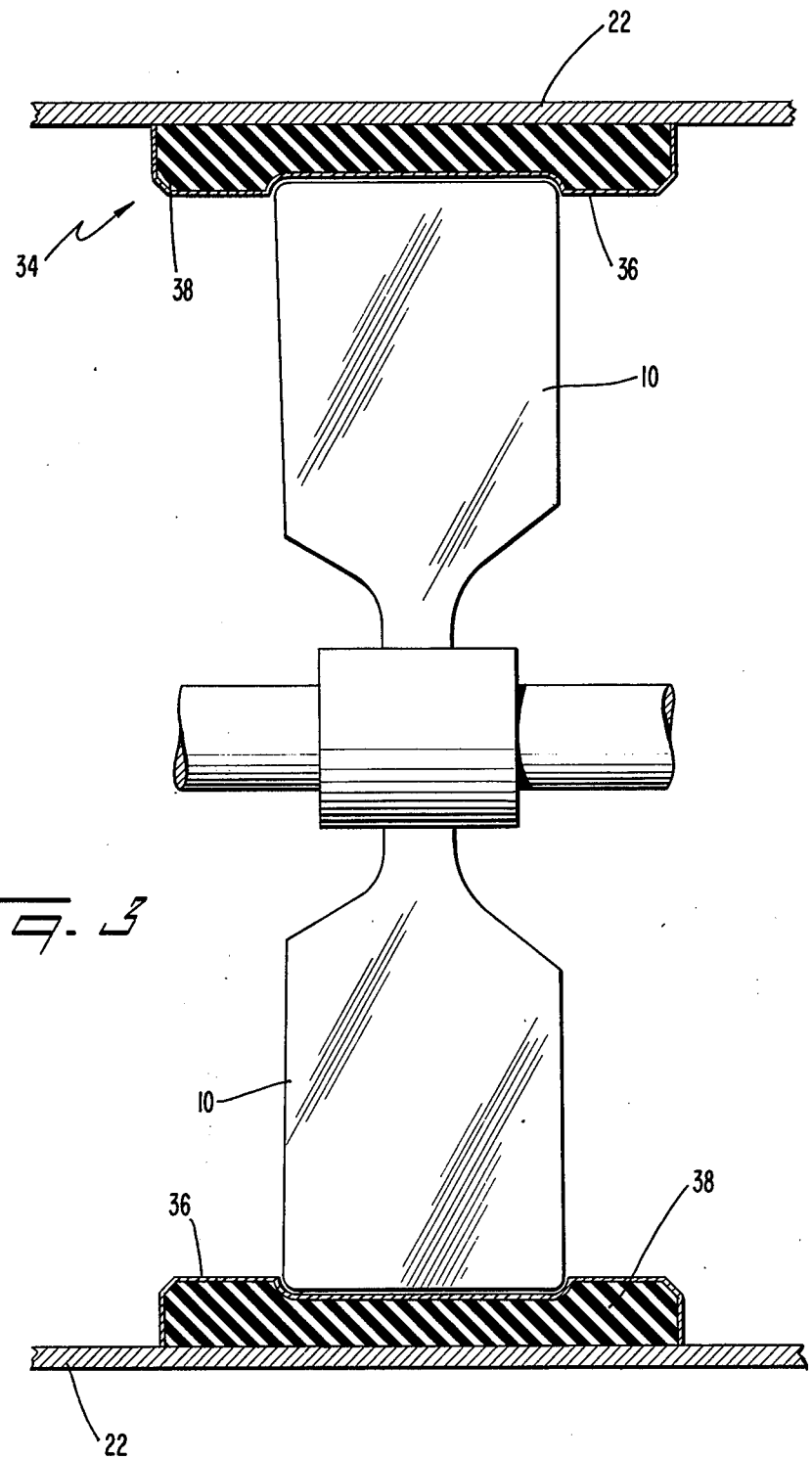

COMPOSITE SEAL FOR TURBOMACHINERY

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

In the design of turbines or compressors of the like, especially those of high speed, it is understood that close tolerance between the tips of the blades and the surrounding shroud or housing which seals one side of the blades from the other is desirable. Such a seal reduces the return flow of fluid from the high pressure to the low pressure side. The closer the shroud surrounds the tips of the blades, the more efficient is the turbine or compressor. Aerodynamic losses are also reduced by closer fitting of the blade tips to the shroud.

Nevertheless the clearance dimensions are dynamic. They increase and decrease with temperature and with mechanical and aerodynamic forces and may increase or decrease faster than the rotor. The clearance may also decrease, for example in one direction, under so-called shock loading when an airplane makes a sudden maneuver that subjects the parts to unusual acceleration forces, causing a differential expansion or movement of the parts.

The prior attack on such problems has been to design the shroud to fit closely, say within 20 to 30 mils (i.e. about 5 to 7 mm.) about the tips of the blades at ambient temperature. Moreover the shroud about the blade has been designed to be wearable or abradable relative to the blade tips. Then if there is a thermal transient or shock loading that causes a blade tip to strike the shroud, the blade material flakes off or abrades the shroud material, which may be a sprayed coating or sintered material of low density. Thus the shroud material is abradable (or wearable) with respect to the blade material. However such wear is not readily achieved in practice. By the arrangement of the present invention the blade tip may be designed to rotate in close proximity to the shroud without fear of cataclysmic destruction of either blade or shroud, should contact between the two occur due to thermal transient or shock loading.

SUMMARY OF THE INVENTION

According to the present invention, there is provided in combination for a turbine rotor or the like a stator shroud of material wearable relative to the blades, a compliant backing of corrugated backing sheets or a compliant backing with a thin ductile layer, and a rigid mounting surrounding the compliant backing. The compliance of the backing tends to cause the shroud when tipped or touched by the rotating blade because of some transient condition to yield somewhat. Then, even though abraded or worn, the compliance of the backing provides a restorative force in the embodiment utilizing the corrugated construction tending to return the shroud at its worn portion toward its original dimension. In the embodiment wherein the compliant backing has a ductile top coating, the normal forces are limited and the blade wear is reduced. Hence any gap is less than in prior instance of such wear, and the useful life of the shroud is increased.

BRIEF DESCRIPTION OF THE DRAWING

The objects, advantages and novel features of the invention will be more fully apparent from the following detailed description when read in connection with the accompanying drawing in which:

FIG. 3 is a schematic view, in longitudinal cross section, of another, preferred embodiment of the invention.

DESCRIPTION OF THE PREFERRED EMBODIMENT

Figure 1:
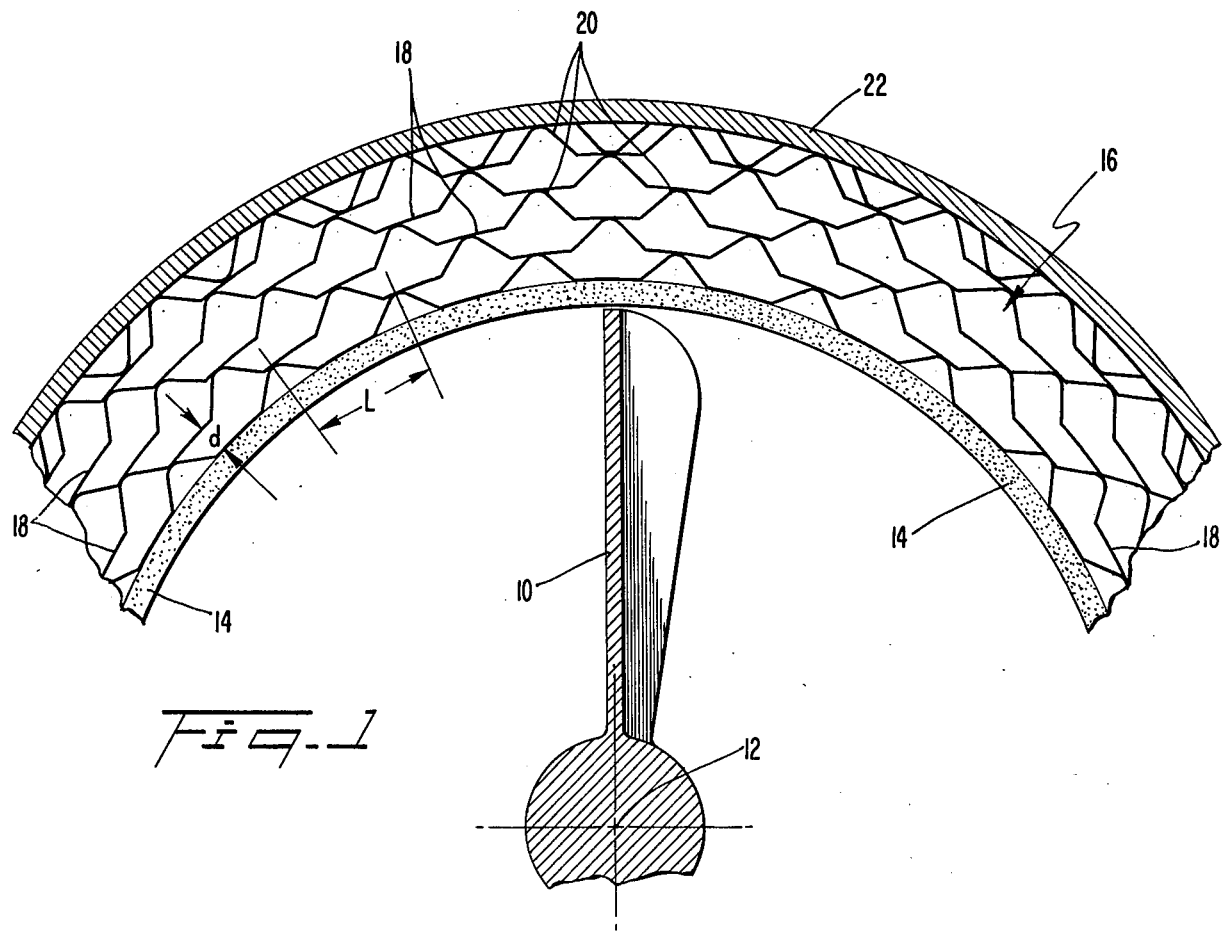
FIG. 1 is a schematic view, in transverse cross section, of an arrangement for a turbine or compressor embodying the invention.

Referring to the figures, a rotor blade 10 of a turbine compressor, for example, rotates about an axis 12 in a counter-clockwise direction as viewed in FIG. 1, tending to force the fluid in which it operates in a direction into the paper. A shroud 14 surrounds the blade 10 and is substantially concentric with the axis 12. The shroud 14 may be of suitable material abradable relative to the material of the blade 10.

A compliant backing 16 surrounds the shroud 14. The backing 16 may be formed of high-temperature metal sheets 18 with corrugations 20 extending substantially longitudinally parallel to the axis 12. The sheets may be bound to each along the lines of contact of the corrugations by brazing or welding, and preferably formed to the as-installed radius of curvature. The abradable shroud is bonded to the concave, inner face of the backing 16. The backing 16 is inserted and bound to a housing 22.

Previous abradable seals, even though various materials for the shroud have been proposed, such as sintered metals, metal honeycombs, and porous ceramics, have not provided a desirable flexibility. After abrasion due to a transient condition such as a thermal transient or shock loading, the gap or wear produced by the rub or contact is generally larger than the interference depth because of tearing out, galling, and spalling.

Figure 2:
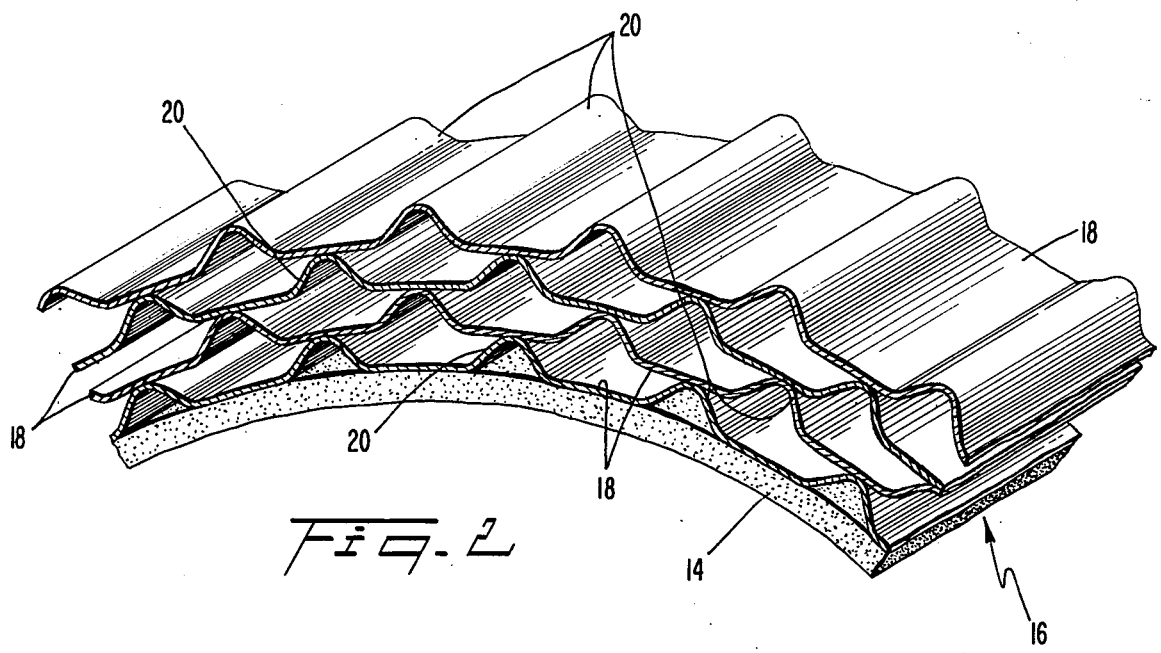
FIG. 2 is a perspective view, partly in section, of the shroud, compliant backing and mounting of the arrangement of FIG. 1.

The seal illustrated in FIGS. 1 and 2 has a certain elasticity. On any incident of contact or rub, the compliant backing 16 tends to be compressed in response to the pressure created by the contact of the blade tip to the shroud 14. As a result the amount of material worn is reduced, and the shroud 14 tends to resume its original dimension at the worn area. Hence the gap resulting from each contact is reduced and the useful life of the shroud is lengthened for a design of comparable clearance of blade to shroud.

The compliance of the backing depends not only upon the material but also the spacing L between corrugations, the depth d of the corrugations and the number of corrugated sheets used.

Referring to FIG. 3 which illustrates a preferred embodiment, the blade 10 is shown at an instant when the forces mentioned above have caused the tip of the blade to contact the shroud. The compliant backing in this case is slightly compressed, the compression as illustrated in the drawing in exaggerated fashion. The material of the shroud 34 may be a relatively thin layer 36 of deformable metallic material. The backing 38 may be of a compliant material, such as a porous rubber or rubber-like material, for example, sponge rubber, low density sintered metal, or gas blown plastic. The metal or metal alloy layer 36 may be a dense plasma sprayed soft metal, such as aluminum, or a bonded metal sheet or foil.

When the blades, as a result of forces such as described hereinbefore, rub against the shroud, the thin metallic layer 36 is deformed into the compliant substrate material 38. In effect because of the compliant substrate material 38 the magnitude of a force normal to the surface of the shroud is limited. (This normal force is measured in the radially inward direction from the shroud.) A larger displacement simply causes a greater deformation without greatly increasing the normal force. Therefore in effect the compliant substrate material limits the magnitude of the normal force which can be developed between the blade tip and the shroud. The more porous and yieldingly deformable the substrate 38 and the thinner the shroud layer 36, the smaller will be the normal force. Because the normal force is low when the blades rub against the shroud, blade wear is reduced.

Currently used shroud materials such as sintered metal or felt metals have disadvantages of low erosion resistance, aerodynamic roughness and porosity which permit back leakage. An arrangement as described in connection with FIG. 3 with the shroud layer as suggested herein provides an aerodynamically smooth surface and high erosion resistance and is substantially less permeable from a leakage standpoint. Furthermore any wear debris produced in the rub is less than that produced in other shroud arrangements. Wear debris tends to plug up turbine cooling holes and to plate out or stick on compressor blades causing aerodynamic losses.

Various modifications may be made. For example metallic sheets (not illustrated) may be distorted by wires aligned parallel to axis 12 to form corrugations for the compliant backing of FIGS. 1 or 2, or these corrugations might extend at angles of less than 90° to the axial direction. Instead of sponge rubber in the compliant backing 38 we may use fibermetal and instead of the thin metallic layer, material such as high temperature resistant ceramic layer may be used.

What is claimed is:
1. In a turbine having a rotor with a plurality of blades thereon mounted for rotation about an axis and a shroud of abradable material surrounding said blades in close relationship to the tips thereof to reduce aerodynamic losses, the improvement comprising
   a plurality of corrugated sheets surrounding said shroud with the corrugations extending longitudinally substantially parallel to said axis of rotation of said rotor to form a compliant backing for said shroud, the innermost sheet being bonded to said shroud and the remaining sheets being bonded to each other along the lines of contact of the respective corrugations with the corrugations of one sheet being offset with respect to those of the next adjacent sheet, and
   a rigid mounting fixture surrounding said compliant backing and being secured to the outermost corrugated sheet.
2. The combination as claimed in claim 1 wherein the corrugated sheets are metal.
3. The combination as claimed in claim 1, said shroud being substantially cylindrical.
4. The combination as claimed in claim 3, said mounting fixture being also cylindrical.
5. A gas path seal for a turbine or the like having a plurality of blades mounted for rotation about an axis comprising
   a stator shroud of material wearable relative to said blades and closely spaced to the blade tips,
   a plurality of corrugated sheets surrounding said shroud with the corrugations extending longitudinally substantially parallel to said axis of rotation, the innermost sheet being bonded to said shroud and the remaining sheets being bonded to each other along the lines of contact of the respective corrugations with the corrugations of one sheet being offset with respect to those of the next adjacent sheet, and
   a rigid mounting fixture surrounding said corrugated sheets and being secured to the outermost corrugated sheet.

* * * * *